US011995876B2

(12) United States Patent
Karasawa

(10) Patent No.: US 11,995,876 B2
(45) Date of Patent: May 28, 2024

(54) TEST STRIP INDICATOR DETERMINING SYSTEM, TERMINAL DEVICE, AND METHOD

(71) Applicant: 3M INNOVATIVE PROPERTIES COMPANY, St. Paul, MN (US)

(72) Inventor: Fumio Karasawa, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 428 days.

(21) Appl. No.: 17/309,581

(22) PCT Filed: Dec. 12, 2019

(86) PCT No.: PCT/IB2019/060722
§ 371 (c)(1),
(2) Date: Jun. 7, 2021

(87) PCT Pub. No.: WO2020/121251
PCT Pub. Date: Jun. 18, 2020

(65) Prior Publication Data
US 2022/0027658 A1 Jan. 27, 2022

(30) Foreign Application Priority Data
Dec. 14, 2018 (JP) ................. 2018-234237

(51) Int. Cl.
G06V 10/22 (2022.01)
G01N 21/77 (2006.01)
G06V 10/56 (2022.01)

(52) U.S. Cl.
CPC ........... *G06V 10/225* (2022.01); *G01N 21/77* (2013.01); *G06V 10/56* (2022.01); *G01N 2021/7759* (2013.01)

(58) Field of Classification Search
CPC ...... G06V 10/225; G06V 10/56; G01N 21/77; G01N 2021/7759
See application file for complete search history.

(56) References Cited

U.S. PATENT DOCUMENTS 6,551,555 B2 * 4/2003 Antonoplos ......... G01N 31/226
436/1
6,884,394 B1 * 4/2005 Hehenberger ......... G01N 21/25
436/1
(Continued)

FOREIGN PATENT DOCUMENTS

CN 1458626 A 11/2003
EP 1363220 A2 11/2003
(Continued)

OTHER PUBLICATIONS

International Search Report for PCT International Application No. PCT/IB2019/060722, dated Mar. 16, 2020, 4 pages.

*Primary Examiner* — Manav Seth
(74) *Attorney, Agent, or Firm* — Sriram Srinivasan

(57) ABSTRACT

PROBLEM To provide a determining system, terminal device, and determining method that can automatically determine various types of indicators. RESOLUTION A determining system determines a status of an indicator where optical properties change under a specific environment, and is provided with: an image acquiring part that acquires an image containing the indicator; a type information acquiring part that acquires information indicating a type of the indicator; a color information acquiring part that acquires color information before change and after change of the indicator corresponding to the type; an extracting part that extracts a first region configured from a color after change of the indicator in the image based on the color information; and the status determining part that determines a shape of the first region extracted by the extracting part and (Continued)

status of the indicator based on a determination status corresponding to the type.

13 Claims, 15 Drawing Sheets

(56) References Cited

U.S. PATENT DOCUMENTS

| | | | | |
|---|---|---|---|---|
| 7,267,799 B1* | 9/2007 | Borich | ............... | G01N 21/8483 422/62 |
| 8,492,162 B2* | 7/2013 | Kippenhan | ............ | G16H 40/20 436/1 |
| 8,889,424 B2* | 11/2014 | Ehrenkranz | ............ | G01N 21/49 435/7.1 |
| 9,311,520 B2* | 4/2016 | Burg | ........................ | G06T 7/70 |
| 9,651,534 B1* | 5/2017 | Ehlert | .................... | G01N 21/78 |
| 2005/0259160 A1 | 11/2005 | Une | | |
| 2006/0240563 A1* | 10/2006 | Kippenhan | ............ | G16H 40/20 436/100 |
| 2010/0239137 A1* | 9/2010 | Pugia | ................... | G01N 21/274 382/128 |
| 2011/0111522 A1* | 5/2011 | Zimmerle | ........ | G01N 33/54388 436/164 |
| 2012/0043376 A1* | 2/2012 | Petrich | ................. | G06K 7/1417 235/494 |
| 2014/0001058 A1* | 1/2014 | Ghaffari | ................. | G01N 27/02 205/792 |
| 2014/0023264 A1 | 1/2014 | Branch | | |
| 2015/0308961 A1 | 10/2015 | Burg | | |
| 2016/0117848 A1 | 4/2016 | Hattori | | |

FOREIGN PATENT DOCUMENTS

| | | | | |
|---|---|---|---|---|
| JP | 9257708 A | 10/1997 | | |
| WO | WO-2014053846 A1 * | 4/2014 | ............ | G01N 21/77 |
| WO | WO2015-100208 | 7/2015 | | |
| WO | WO-2017139843 A1 * | 8/2017 | | |
| WO | WO2018-106415 | 6/2018 | | |

* cited by examiner

| Indicator type | Ratio | Color (background) | Color (reacted) | Image processing |
|---|---|---|---|---|
| A 0002 | $Th1_{ratio}$ | $Ref1_{color\_background}$ | $Ref1_{color\_reacted}$ | Filter 1 |
| A 0003 | $Th2_{ratio}$ | $Ref2_{color\_background}$ | $Ref2_{color\_reacted}$ | Filter 2 |
| A 0004 | $Th3_{ratio}$ | $Ref3_{color\_background}$ | $Ref3_{color\_reacted}$ | Filter 3 |
| B 0001 | $Th4_{ratio}$ | $Ref4_{color\_background}$ | $Ref4_{color\_reacted}$ | Filter 4 |
| ... | $Th5_{ratio}$ | $Ref5_{color\_background}$ | $Ref5_{color\_reacted}$ | Filter 5 |
| | ... | ... | ... | ... |

FIG. 5

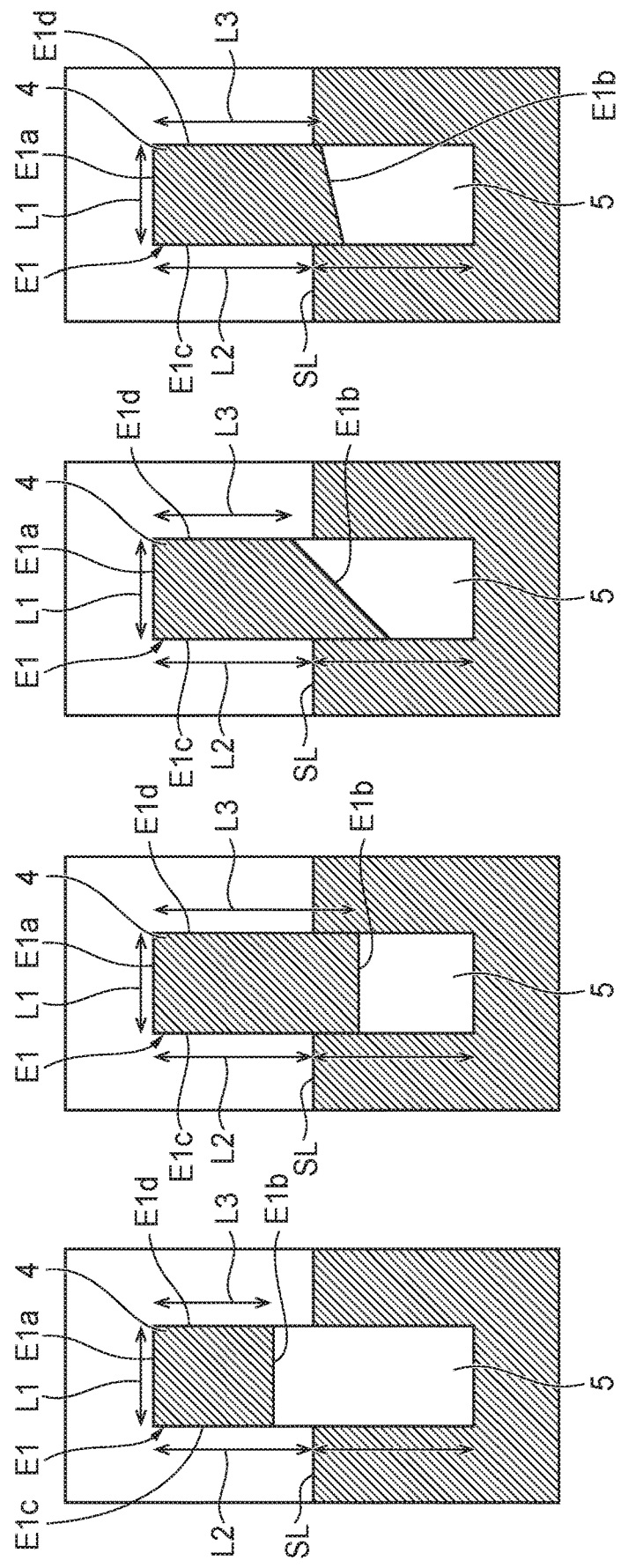

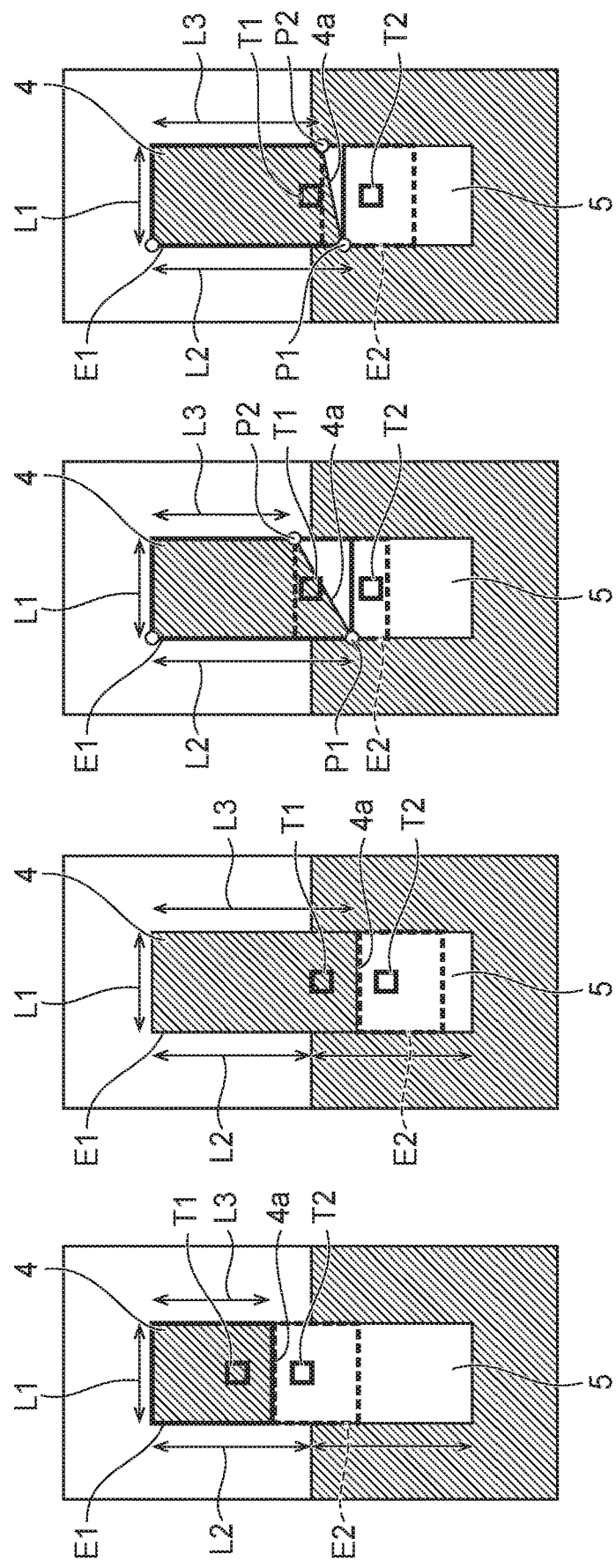

TEST STRIP INDICATOR DETERMINING SYSTEM, TERMINAL DEVICE, AND METHOD

CROSS-REFERENCE TO RELATED APPLICATIONS

This application is a national stage filing under 35 U.S.C. 371 of PCT/IB2019/060722, filed 12 Dec. 2019, which claims the benefit of JP Patent Application No. 2018-234237, filed 14 Dec. 2018, the entire disclosure of each of which is incorporated herein by reference.

TECHNICAL FIELD

One aspect of the present disclosure relates to a determining system, terminal device, and determining method.

BACKGROUND TECHNOLOGY

For example, various types of sterilization processes are performed in order to sterilize articles that can be reused in the medical field. A biological indicator or a physical indicator are used, for example, in order to determine whether the required conditions for sterilization have been met. Patent document 1 describes a device that measures sterilization level by measuring a measurement color value of a color changing part of an indicator, and converting the measurement value to a sterilization level. Patent document 2 describes a device for determining optical color change of an indicator.

SUMMARY

Problem to be Solved

When determining change in the status of various indicators, a visual determination is required, but there is a possibility of individual differences in determination and erroneous determinations. Therefore, there is demand for a determining system that can automatically determine various types of indicators.

Means for Solving Problems

The determining system according to one aspect of the present embodiment is a determining system that determines a status of an indicator where optical properties change under a specific environment, and is provided with: an image acquiring part that acquires an image containing the indicator; a type information acquiring part that acquires information indicating a type of the indicator; a color information acquiring part that acquires color information before change and after change of the indicator corresponding to the type; an extracting part that extracts a first region configured from a color after change of the indicator in the image based on the color information; and a status determining part that determines a shape of the first region extracted by the extracting part and status of the indicator based on a determination status corresponding to the type.

The terminal device according to one aspect of the present embodiment is a terminal device that determines a status of an indicator where optical properties change under a specific environment, and is provided with: an image acquiring part that acquires an image containing the indicator; a type information acquiring part that acquires information indicating a type of the indicator; a color information acquiring part that acquires color information before change and after change of the indicator corresponding to the type; an extracting part that extracts a first region configured from a color after change of the indicator in the image based on the color information; and a status acquiring part that acquires a shape of the first region extracted by the extracting part and status of the indicator based on a determination status corresponding to the type.

The determining method according to one aspect of the present embodiment is a determining method that determines a status of an indicator where optical properties change under a specific environment, and is provided with: an image acquiring step that acquires an image containing the indicator; a type information acquiring step that acquires information indicating a type of the indicator; a color information acquiring step that acquires color information before change and after change of the indicator corresponding to the type; an extracting step that extracts a first region configured from a color after change of the indicator in the image based on the color information; and a status determining step that determines a shape of the first region extracted by the extracting step and status of the indicator based on a determination status corresponding to the type.

Effect

One aspect of the present disclosure can automatically determine various types of indicators.

BRIEF DESCRIPTION OF THE DRAWINGS

FIG. 5 is an example of a determination status table.

FIG. 6 is a concept diagram illustrating a condition of shape determination.

FIG. 7 is a concept diagram illustrating a condition of status determination.

DESCRIPTION OF THE PREFERRED EMBODIMENTS

Figure 1:
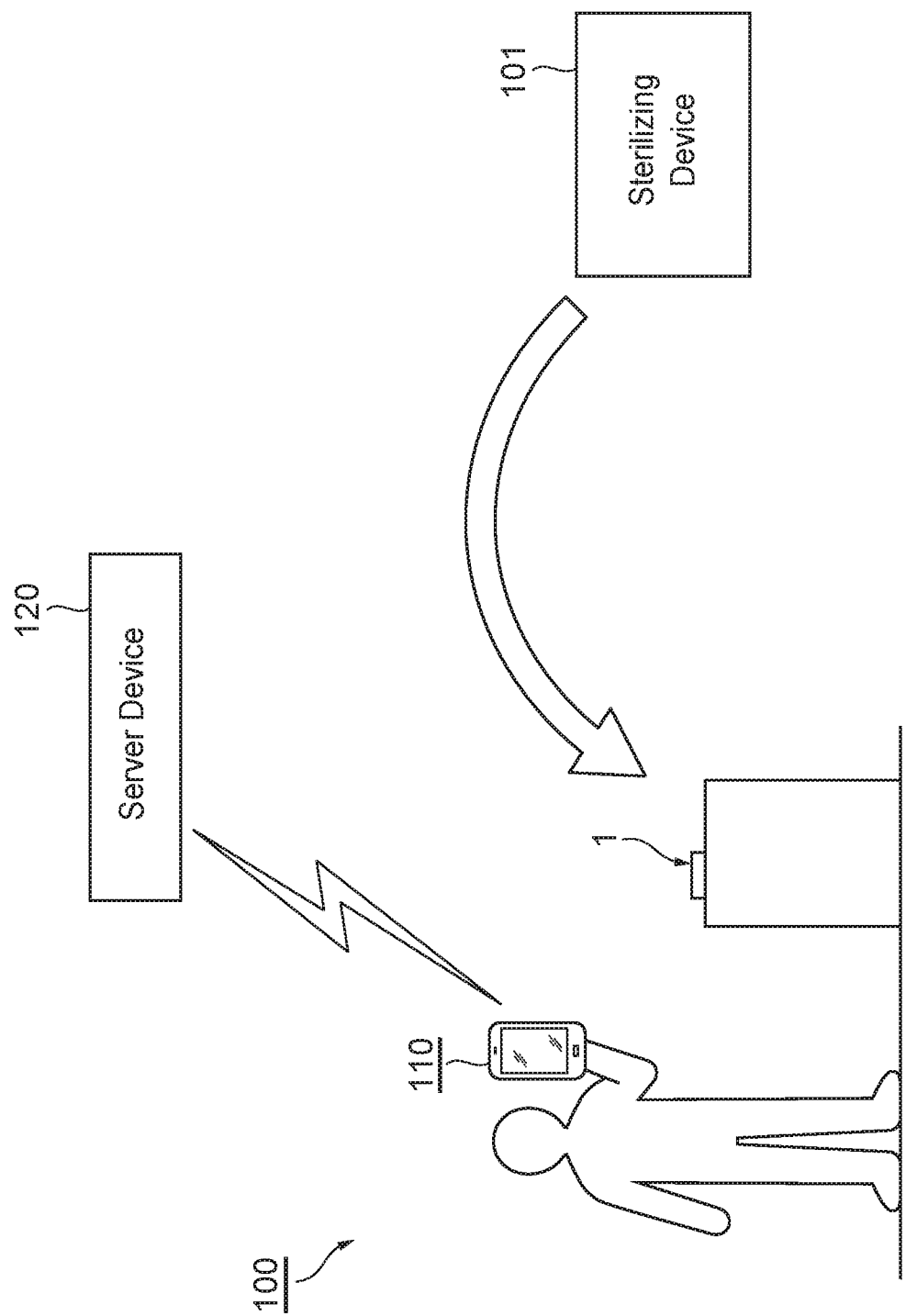
FIG. 1 is a schematic component diagram of a determining system according to an embodiment of the present disclosure.

An embodiment for performing the present disclosure will be described below in detail while referring to the drawings.

In the description of the drawings, identical or similar elements are assigned the same symbols, and a duplicate description is omitted.

A determining system 100 according to the present embodiment will be described while referring FIG. 1. The determining system 100 is a system for determining a status of an indicator that changes optical properties based on a specific environment. The determining system 100 has a terminal device 110 and a server device 120. The terminal device 110 captures an image of an indicator 1 after processing, and determines a status of the indicator 1 based on that image. The terminal device 110 is a device that can launch an application to capture an image and perform various types of operations, such as a smart phone, tablet terminal, touch panel type laptop personal computer, and the like. The server device 120 performs communication with the terminal device 110, and exchanges various types of information.

The indicator changes optical properties such as color, refractive index, and the like, based on a specific environment. Examples of the indicator include sterilization indicators that are used for confirming whether an appropriate sterilization step has been achieved, indicators for confirming a status of using a mask, indicators that can determine degree of contamination, degree of cleaning, degree of cleanliness, or the like. In the present embodiment, an example of making determination of an indicator 1 for sterilization is described, as illustrated in FIG. 1. Examples of the indicator 1 for sterilization include physical indicators, biological indicators, and chemical indicators. Physical indicators are those that use some type of physical change (temperature, or the like). Biological indicators are those that detect the actual bacteria by culturing or the like. Chemical indicators are those that react to important parameters to confirm achievement of required conditions such as penetration of a sterilizing agent (steam or EO gas), temperature, time, and the like. The indicator 1 of the present embodiment is described as a chemical indicator (CI), but a physical indicator (PI) or a biological indicator (BI) can also be suitably used.

Figure 2B:
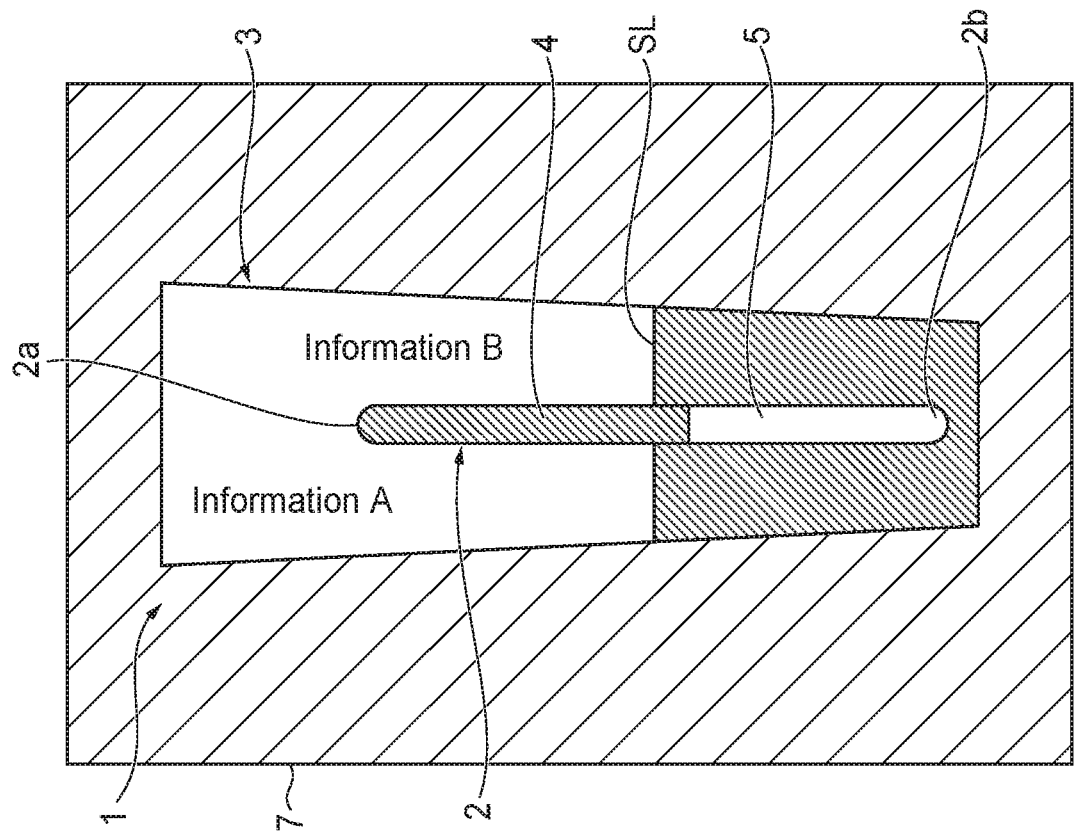
FIG. 2 is a diagram illustrating an indicator.
Figure 2A:
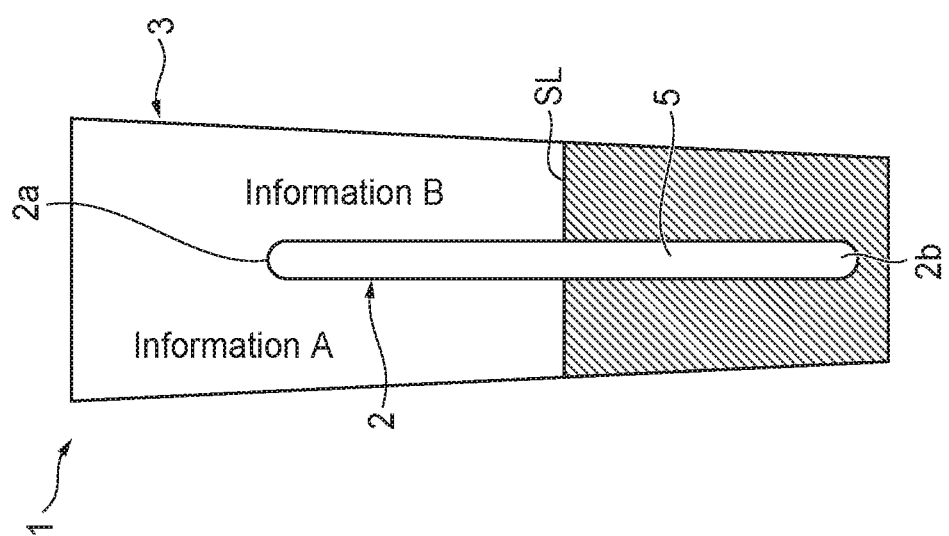

The indicator 1 is placed in a sterilization device 101 together with a medical instrument such as a surgical instrument like a scalpel, or a mechanical instrument like an endoscope, and then autoclave sterilization or the like is performed. The indicator 1 displays whether or not suitable sterilization has been performed based on a reaction status of a displaying part 2 that changes color based on a reaction in conjunction with the sterilization process. As illustrated in FIG. 2, the indicator 1 has a displaying part 2 and a base part 3. The base part 3 is configured such that a surface of a plate-like member is covered by a film, and has a trapezoidal shape that extends in a longitudinal direction. A displaying part 2 that extends in the longitudinal direction is formed at a center position of the base part 3. Before change, the displaying part 2 is all white (refer to FIG. 2 (a)). FIG. 2 is a diagram illustrating a schematic diagram of an image of the unreacted indicator 1 is captured by the terminal device 110. For example, the indicator 1 is photographed in a condition placed on a backboard 7. The color of the displaying part 2 changes to a deep color by reacting to a function related to sterilization. The color after change proceeds so as to extend from an end part 2a side to an end part 2b side in conjunction with exposure to the sterilization process. Note that in the following description, the portion of the display in part 2 where the color has changed due to the reaction is referred to as the reacted part 4, and the section that has not reacted and where the color has not changed is referred to as the unreacted part 5. A reference line SL is provided at a position part way along the longitudinal direction of the displaying part 2. when the indicator 1 is observed after completion of the sterilization process, a determination of "sterilization complete" can be made if the reacted part 4 extends to the reference line SL, and a determination of "sterilization incomplete" can be made if the reference line is not reached.

Note that various types of information are provided in the region on the outer side of the displaying part 2 on the surface of the base part 3 of the indicator 1. For example, the region that is to the end part 2a side of the reference line SL on the surface of the base part 3 is displayed as white, and the region on the end part 2b side is displayed as a dark color. Thereby, the user determines whether or not the reacted part 4 extends to the region on the end part 2b side of the reference line SL indicating "sterilization complete". Furthermore, a plurality of information is provided on the surface of the base part 3. For example, "information A" includes a label name or the like indicating the type of indicator of the indicator 1, or the like. If the indicator 1 is used with steam sterilization, "information A" shows "Chemical Indicator" as the label name. "Information B" provides information (part number or the like) indicating the type of indicator 1. The aforementioned arrangement and information is an example, and other forms may be used.

Figure 3:
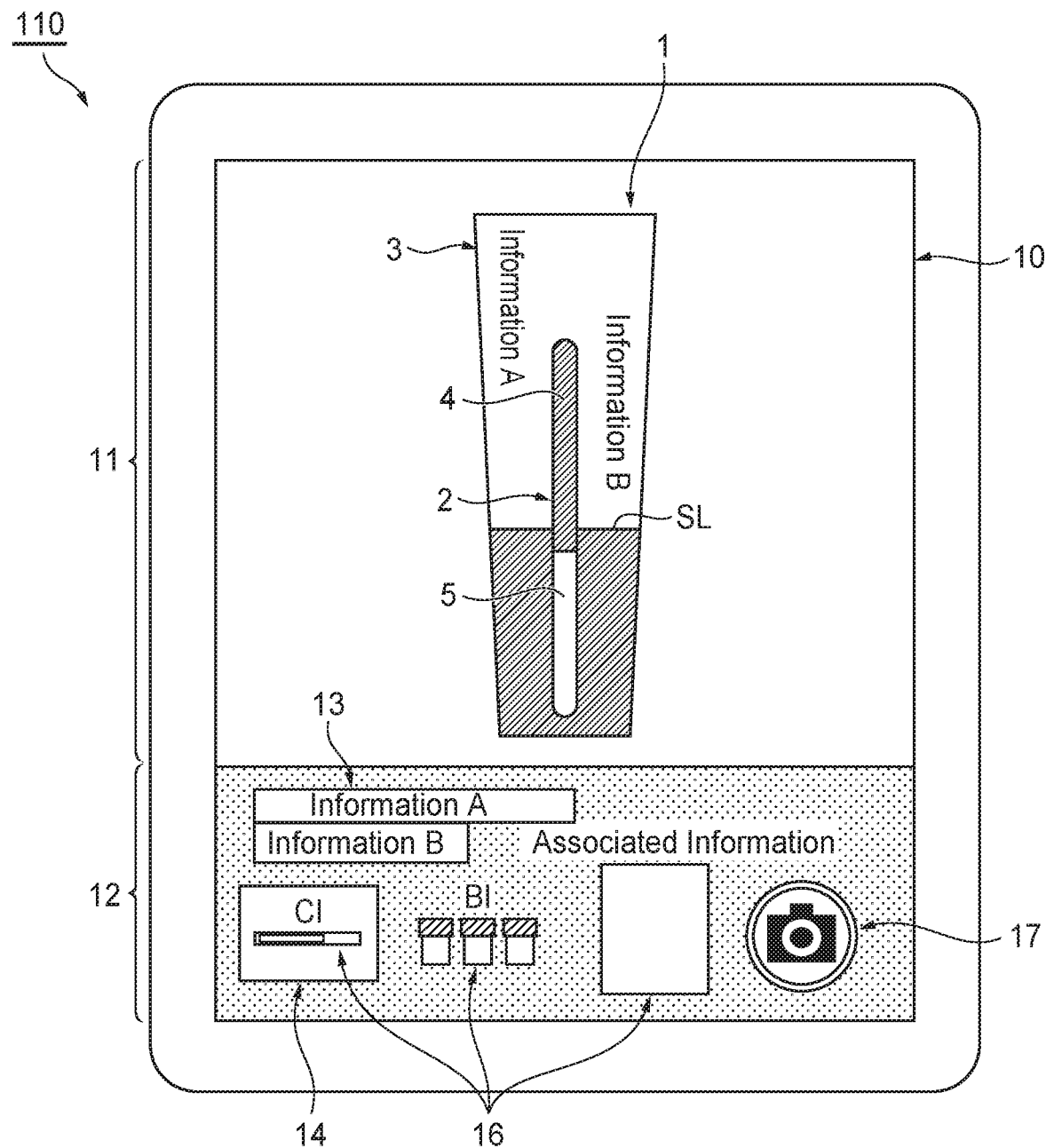
FIG. 3 is a diagram illustrating a screen of a terminal device

Next, an example of a screen 10 that is displayed on a display of the terminal device 110 (not illustrated in FIG. 3) is described while referencing FIG. 3. FIG. 3 illustrates an example of the screen 10 when an application is launched for performing determination of the indicator 1. The screen 10 has an image region 11 that displays an image of the indicator 1, and an operating region 12 that displays various types of information and operating buttons. A user incorporates an image by photographing the indicator 1 using a camera of the terminal device 110, and determines the status of the indicator 1 by performing an operation using the operating region 12. furthermore, the user associates the determination results with various types of information, and registers this information in the server device 120.

The operating region 12 has an information displaying part 13, information selecting part 14, registration candidate displaying part 16, and a button 17. The information displaying part 13 displays the content of "information A" and "information B" as the information indicating the type of the indicator 1. The registration candidate displaying part 16 presents to the user candidates of the information to register. In the example of FIG. 3, three icons are presented, namely Chemical Indicator (CI), Biological Indicator (BI), and Associated information. The information selecting part 14 is a part that selects the information to be registered and displays the selected information. for example, in the present embodiment, determination is performed based on a "Chemical Indicator", and therefore "CI" is selected in the information selecting part 14. The selection can be performed by the user, or can be automatically made by performing an image confirmation process on the image displayed on the image region 11. The image confirmation process can be performed by the terminal device 110, or can be performed by the server device 120. The symbol "BI" displayed on the registration candidate displaying part 16 is a portion that is selected when determination is performed for a "Biological Indicator". The associated information displayed on the registration candidate displaying part 16 is a part that is selected when incorporating the associated information described below as an image. Note that when registering a "Biological Indicator", there are cases where time is required until the culture reaction, and therefore the configuration may be such that the elapsed time from sterilization to determination is also registered. The button 17 is a button for operating when instructing to photograph, make a determination, or incorporate a record.

Figure 4:
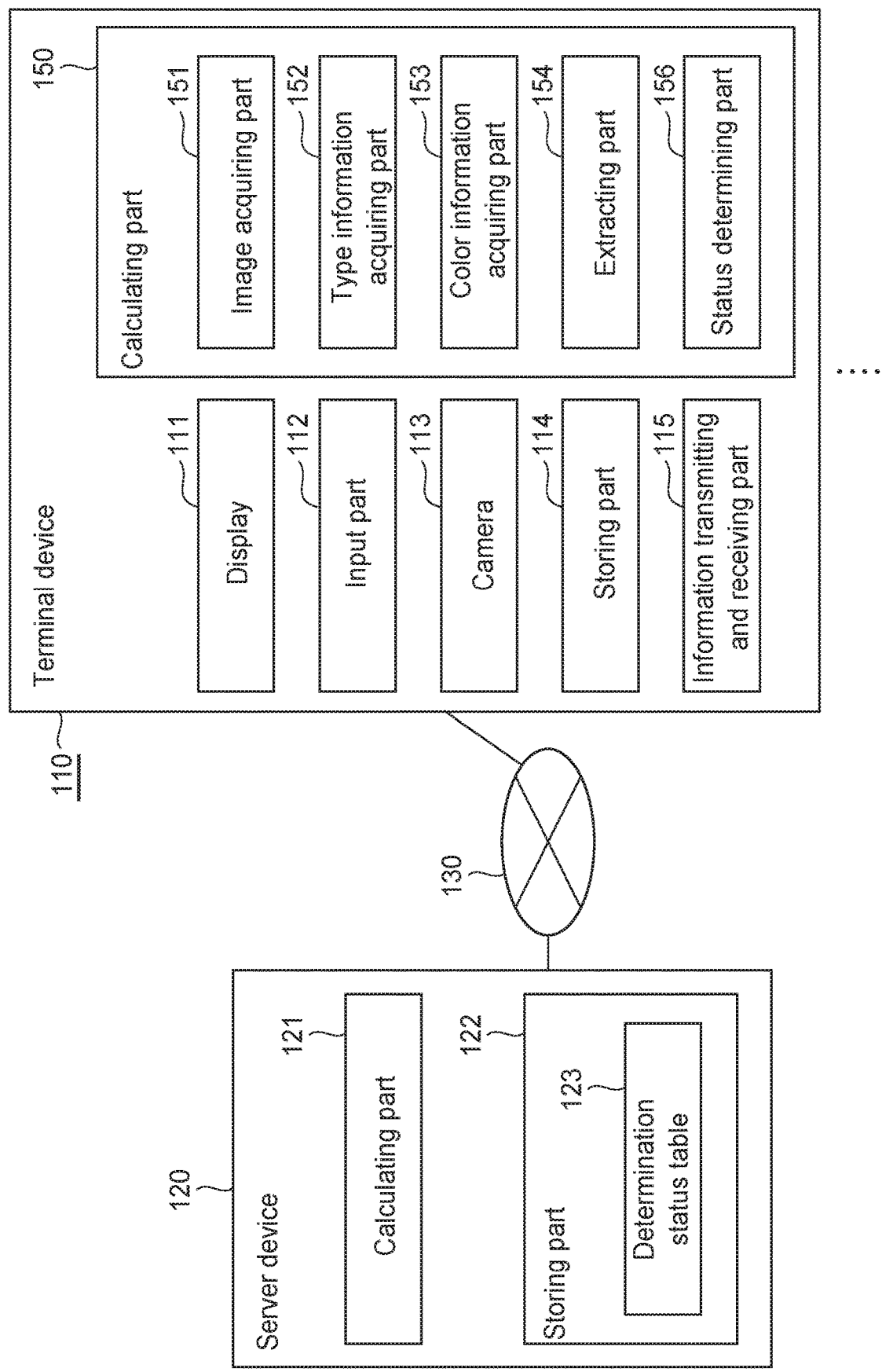
FIG. 4 is a block component diagram of the determining system.

Next, a block diagram of the determining system 100 is described while referring FIG. 4. As illustrated in FIG. 4, the server device 120 communicates with a plurality of terminal devices 110 through a network 130. The server device 120 provides at least an operating part 121 that performs various types of operations and a storing part that stores various types of information. The storing part 122 stores a determination status table 123 for the determination status that corresponds to the type of indicator. The details of the judgment status table 123 are described below. Note that the present embodiment describes a configuration where the server device 120 has a determination status table 123 and performs a process that determines the status of the indicator, but all or a portion of the determination status table 123 can be incorporated in the terminal device 110. Furthermore, a configuration is also acceptable where all or a portion of various types of operating processes are performed by the terminal device 110.

The terminal device 110 includes a display 111, input part 112, camera 113, storing part 114, information transmitting and receiving part 115, and calculating part 150. As illustrated in FIG. 3, the terminal device 110 may have a touch panel type screen 10 where the display 111 and the input part 112 are integrated. The camera 113 is a part for photographing the indicator 1 and incorporating as image data. The storing part 114 is configured by internal memory, external memory, or the like, and stores various types of information.

The calculating part 150 is a part that performs various types of calculations of the terminal device 110. The calculating part 150 is configured of a processor, memory, and the like. The processor is a calculating device such as a central processing unit (CPU) or the like. The memory is a storage medium such as read-only memory (ROM) or random-access memory (RAM), or the like. The calculating part 150 loads a program that is stored in ROM to RAM, and performs various types of functions by causing the CPU to execute the program that is loaded into RAM. The calculating part 150 includes at least an image acquiring part 151, type information acquiring part 152, color information acquiring part 153, extracting part 154, and status determining part 156.

The image acquiring part 151 acquires an image including the indicator 1. The image acquiring part 151 acquires the image photographed by the camera 113. The image acquiring part 151 displays the acquired image on the image region 11 of the screen 10. Herein, the indicator 1 may be photographed in a condition placed on a backboard 7 (refer to FIG. 2 (b)), and then that image is acquired by the image acquiring part 151. The backboard 7 may be a specific material that is provided by the manufacturer of the indicator 1, for example. For example, if the background of the indicator 1 in the image is different each time a photograph is taken, there is a possibility of affecting the extracting process that is performed by the extracting part 154 that will be described below. On the other hand, if the backgrounds of the indicator 1 in the images are common, the accuracy of the extracting process can be enhanced. The color of the backboard 7 can be any color, for example, but is preferably a color that is not included in the indicator 1. Note that the color of the backboard 7 is not displayed in particular on the background of the image region 11 of FIG. 3. Note that it is also acceptable for the indicator 1 be photographed in a condition that is not placed on the backboard 7.

The image acquiring part 151 may all of the indicator 1 in the image based on the color of the backboard 7 in the image. For example, even if the same color is captured, the color in the image may be slightly different for different terminal devices 110 or even for the same terminal device 110 using different photographs, depending on the settings and performance of the camera 113. Therefore, the color in the image can be appropriately corrected by using the color in the image of the backboard 7, which has a standard color. Therefore, the image acquiring part 151 corrects the color such that the color of the indicator 1 in the image is as close as possible for all images.

The type information acquiring part 152 acquires information showing the type of the indicator. The type information acquiring part 152 automatically determines the type from the image acquired by the image acquiring part 151. In other words, the type information acquiring part 152 determines the type by extracting and reading the information indicating the type of the indicator 1 from the acquired image. For example, the type information acquiring part 152 reads the "information A" and "information B" (refer to FIG. 3) that is shown on the indicator 1 from the image, and automatically determines the type based on that content. Alternatively, the type information acquiring part 152 may acquire the type based on information selected by the information selecting part 14. Furthermore, the type information acquiring part 152 automatically determines the type from the image, presents the type to the user, and then the user presses a confirmation button or the user changes the type to another type in order to confirm the type.

Note that the information transmitting and receiving part 115 can transmit to the server device 120 the type information that was confirmed to be the type subject to determination by the type information acquiring part 152, and can receive determination status that corresponds to that type. A determination status table 123 is stored in the storing part 122 of the server device 120. The determination status table 123 has information as shown in FIG. 5, for example. The termination status table of FIG. 5 contains an aspect ratio of the extracted shape (details described below), the background color of the indicator 1 (equivalent to the color of the unreacted part 5), the color of the reacted part 4, and information for image processing, for each type of indicator 1. Image processing is information related to a filter for correcting the color in order to simplify the determination of the type of indicator that is subject to determination. Alternatively, the information transmitting and receiving part 115 may receive the entire determination status table 123 of the server device 120 and store the table in the storing part 114.

The color information acquiring part 153 acquires color information before and after change of the indicator 1 that correspondence to the type. The color information prior to the change of the indicator 1 is information showing the color of the unreacted part 5 in FIG. 3. The color information after the change of the indicator 1 is information showing the color of the reacted part 4 in FIG. 3. The color information acquiring part 153 acquires the color information associated with the type that was acquired by the type information acquiring part 152. For example, the color information acquiring part 153 can acquire the color information from the determination status table as shown in FIG. 5. The color information acquiring part 153 acquires the color information of the unreacted part 5 and reacted part 4 that are associated with the type that is subject to determination from the determination status table.

The extracting part 154 extracts the first region that includes at least the color after change of the indicator in the image (in other words, the color of the reacted part 4) in order to determine the status of the indicator 1 based on the color information acquired by the color information acquiring part 153. Furthermore, a status determining part 156 determines the status of the indicator based on a determination status that corresponds to the type and the shape of the first region that was extracted by the extracting part 154.

Figure 8B:
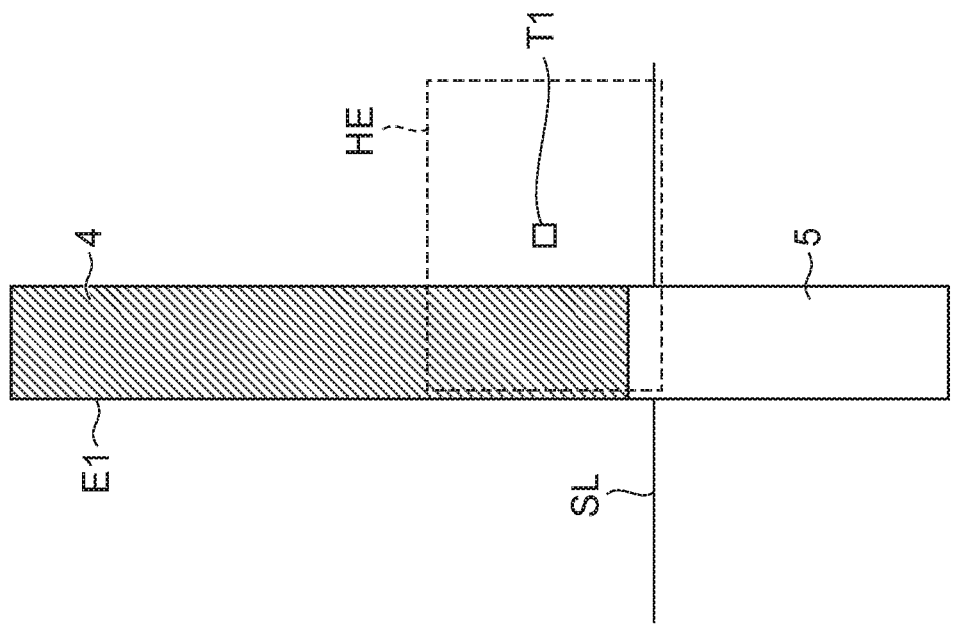
FIG. 8 is a concept diagram illustrating a condition of extracting the first region.
Figure 8A:
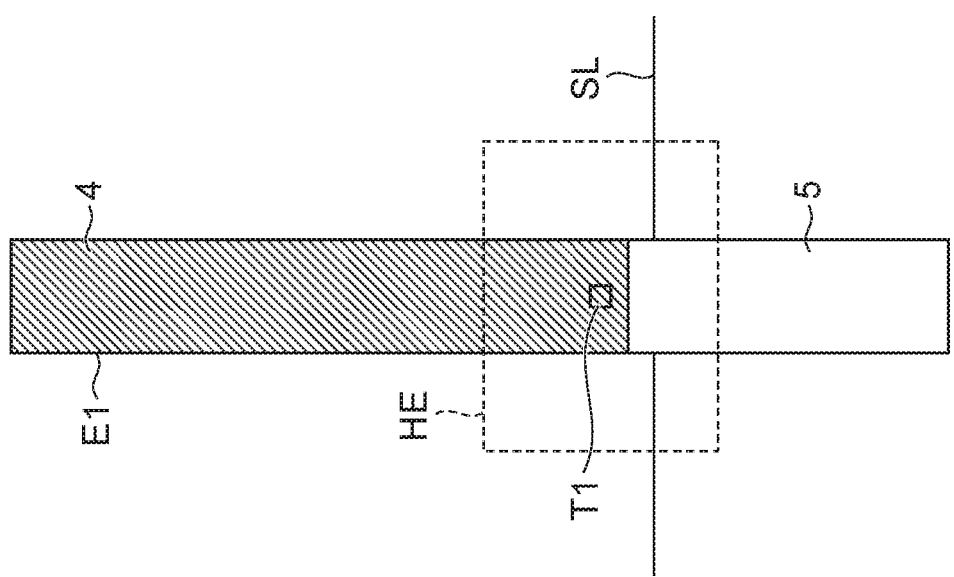

Herein, an example of region extraction by the extracting part 154 and the status determination by the status determining part 156 are described while referring to FIG. 6 through FIG. 8. Note that FIG. 6 through FIG. 8 shows the display part 2 of the indicator 1 of FIG. 4 in a deformed shape for ease in understanding.

As illustrated in FIGS. 6 (a) and (b), the extracting part 154 extracts the first region E1 that includes the color of the indicator 1 after change. The extracting part 154 extracts the region of the image that indicates the reacted part 4 as the first region E1. The first region E1 has a shape that is substantially elongated. However, an upper edge E1a of the first region E1 is an arc shaped edge as illustrated in FIG. 4, but the lower edge E1b is a straight line. Furthermore, the first region E1 has long edges E1c and E1d that extend in the longitudinal direction. Hearing, if the lateral width of the first region E1 is dimension L1 and the distance between the upper edge E1a and the reference line SL is dimension L2, the ratio "dimension L2/dimension L1" (hereinafter also referred to as the reference ratio) is uniquely determined regardless of the size of the first region E1 in the image. If the vertical length of the first region E1 is dimension L3, the aspect ratio of the first region E1 is expressed as "dimension L3/dimension L1". The aspect ratio is uniquely determined regardless of the size of the first region E1 in the image. Therefore, the status determining part 156 determines the status of the indicator 1 based on the aspect ratio of the first region E1. Specifically, the status determining part 156 determines that sterilization is incomplete if it is determined that the aspect ratio is smaller than the reference ratio, as illustrated in FIG. 6 (a). The status determining part 156 determines that sterilization is complete if it is determined that the aspect ratio is greater than the reference ratio.

The lower edge E1b may be inclined as illustrated in FIGS. 6 (c) and (d). In this case, the status determining part 156 determines the status of the indicator 1 by comparing the length of the long edge E1c and the long edge E1d. The status determining part 156 guides the aspect ratio based on the shorter of the long edge E1c and the long edge E1d. Herein, the long edge E1d is shorter, so the aspect ratio is expressed as "dimension L3/dimension L1". In FIG. 6 (c), the longer long edge E1c extends to the reference line SL, but the shorter long edge E1d does not reach the reference line SL. Therefore, the status determining part 156 determines that the aspect ratio 'is smaller than the reference ratio, and determines that sterilization is incomplete. In FIG. 6 (d), the longer long edge E1c is shorter than in FIG. 6 (c), but both long edges E1c and E1d reach the reference line SL. Therefore, the status determining part 156 determines that the aspect ratio is greater than the reference ratio, and determines that sterilization is complete.

As illustrated in FIG. 7, the extracting part 154 extracts the first region E1 and also extracts the second region E2 that includes the color before change of the indicator in the image. Furthermore, the status determining part 156 determines the status of the indicator 1 based on whether or not there is overlap between the first region E1 and the second region E2. In this embodiment, the user touches the reacted part 4 on the screen when extracting the first region E1, and the user touches the unreacted part 5 on the screen when extracting the second region E2. Specifically, the extracting part 154 extracts a region having the same color as the touch point T1 that was touched by the user, and defines this region as the first region E1. Furthermore, the extracting part 154 extracts a region having the same color as the touch point T2 that was touched by the user, and defines this region as the second region E2. However, the upper edge of the second region E2 is important because it is a region that is adjacent to the first region E1, but the lower edge is not used in the determination. Therefore, the extracting part 100 and $0.54 the lower edge of the second region E2 to be at a location a specific dimension from the upper edge. In FIGS. 7 (a) and (b), the lower edge 4a of the reacted part 4 extends linearly in the lateral direction. In this case, the first region EU one and the second region E2 will not overlap. Therefore, the status determining part 156 detects that the first region E1 and second region E2 do not overlap, and therefore can determine that the lower edge 4a of the reacted part 4 extends linearly in the horizontal direction. In this case, whether or not sterilization is complete can be determined by determining the aspect ratio of the first region E1 and the reference ratio. Note that a configuration is also possible that eliminates touching by the user in order to extract the second region E2. In this case, a configuration is also possible that extracts the first region E1 that was previously extracted and that extracts a region that satisfies a specific positional relationship in the image as the second region E2. Furthermore, a configuration is also possible that extracts the first region E1 without acquiring the touch point T1 by an operation of the user. For example, extraction can be achieved by setting the imaging condition (position and size in the image) of the indicator 1 within a predetermined range or by performing image recognition.

On the other hand, in FIGS. 7(c) and (d), a lower edge 4a of the reacted part 4 is inclined. In this case, the extracting part 154 extracts a rectangular region having a lowermost point P1 as a reference as a first region E1 of lower end portions of the reacted part 4. Furthermore, the extracting part 154 extracts a rectangular region having an uppermost point P2 as a reference as a second region E2 of upper end portions of the unreacted part 5. The status determining part determines that the first region E1 and second region E2 overlap, and based thereon, grasps that the lower edge 4a of the reacted part 4 is inclined. The status determining part 156 acquires a dimension L3 of the point P2 from an upper edge of the first region E1, and compares a reference ratio and aspect ratio of "dimension L3/dimension L1". In FIG. 7(c), the point P2 does not reach the reference line SL. Therefore, the status determining part 156 determines that the aspect ratio 'is smaller than the reference ratio, and determines that sterilization is incomplete. In FIG. 6(d), the point P2 does not reach the reference line SL. Therefore, the status determining part 156 determines that the aspect ratio is greater than the reference ratio, and determines that sterilization is complete.

As illustrated in FIG. 8, the extracting part 154 may extract the first region E1 based on acquiring a histogram of a color in an image displayed in a periphery of a location touched by a user (touch point T1), of screens displaying an image. For example, the extracting part 154 acquires a histogram of a color in region HE within a predetermined range of a periphery of the touch point T1. In this case, the extracting part 154 can grasp that a dark color of the reacted part 4 and light color in a periphery of the reacted part 4 are present. The extracting part 154 specifies a color of the reacted part 4 from the histogram, and extracts a region having the same color as the color as the first region. Note that in the histogram, a lighted colored point adjacent to the reacted part 4 in a longitudinal direction is the unreacted part 5, and therefore, the extracting part 154 can extract the second region. As illustrated in FIG. 8(b), even if a user touches outside of the reacted part 4, the extracting part 154 acquires a histogram of the region HE in a periphery of the touch point T1, and therefore can grasp a color of the reacted part 4. Note that if the color of the reacted part 4 resembles a color of the base part 3 or backboard 7, the region where the histogram is acquired can be limited to be within a range of the displaying part 2 or indicator 1 to improve accuracy.

Figure 9C:
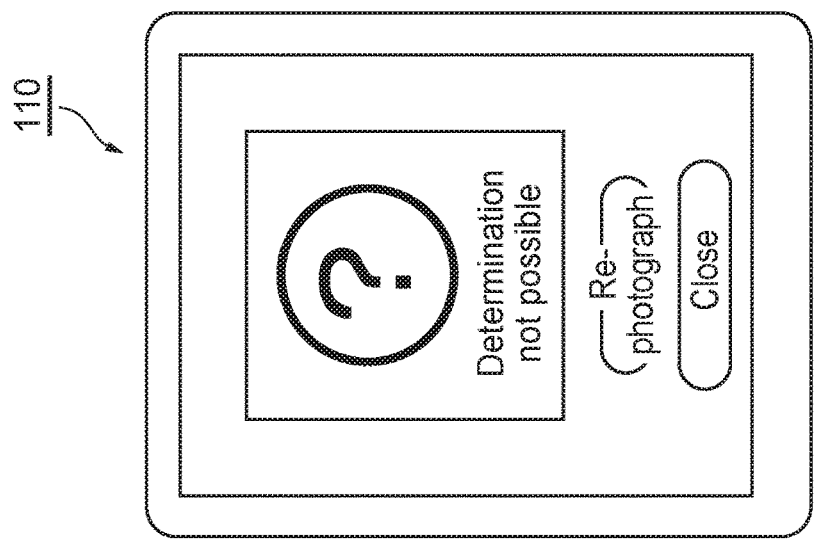
FIG. 9 is an example of a screen when the results of status determination are presented.
Figure 9B:
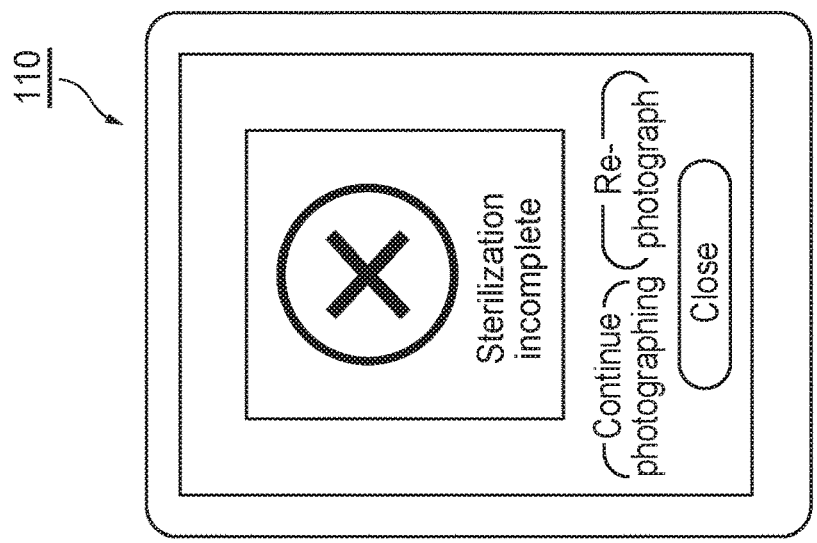
Figure 9A:
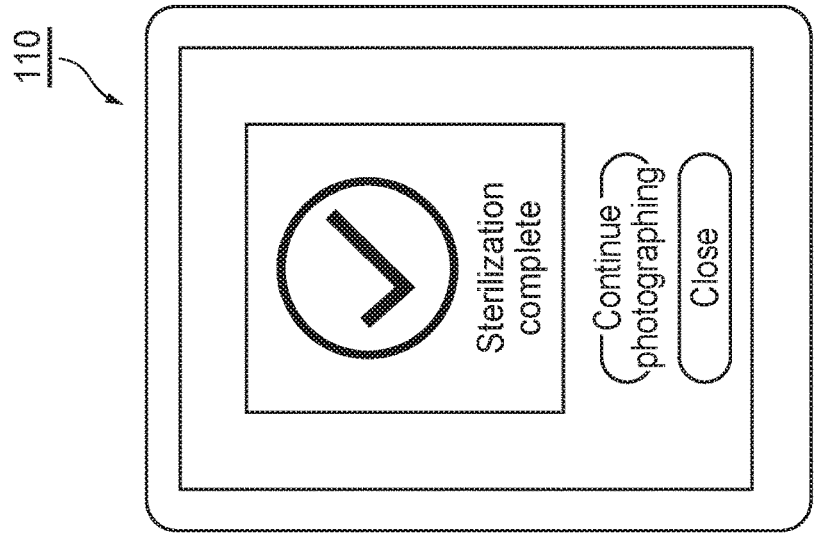

The status determining part 156 can present a determination result on a screen. For example, as illustrated in FIGS. 9(a) and (b), if the status determining part 156 determines that sterilization is complete or incomplete, a gist thereof is displayed on the screen. Furthermore, there are cases where determination is correct or unknown due to an inadequate usage condition or the like. For example, if a lower end of the reacted part 4 rapidly becomes too inclined, the status determining part 156 determines that determination is not possible. As illustrated in FIG. 9(c), a gist thereof is displayed on a screen.

As described above, the status determining part 156 may determine a status of the indicator 1, and then transmit the determination results to the server device 120. The information transmitting and receiving part 115 mutually associates image information acquired by the image acquiring part 151, determination results by the status determining part 156, and supplementary information related to the indicator 1 performing determination, and then transmits the information to the storing part 122 of the server device 120. Thereby, the supplementary information can be stored corresponding to the determination results of sterilization and an image of the indicator 1. The supplementary information, for example, can be acquired by imaging a voucher that is transferred along with an instrument to be sterilized. The calculating part 150 may convert the supplementary information into data by performing OCR (Optical Character Recognition) on a captured image. Examples of the supplementary information include hospital names, dates and times, product names of instruments to be sterilized, IDs of instrument sets, sterilizing techniques, sterilization practitioners, and the like.

Figure 11:
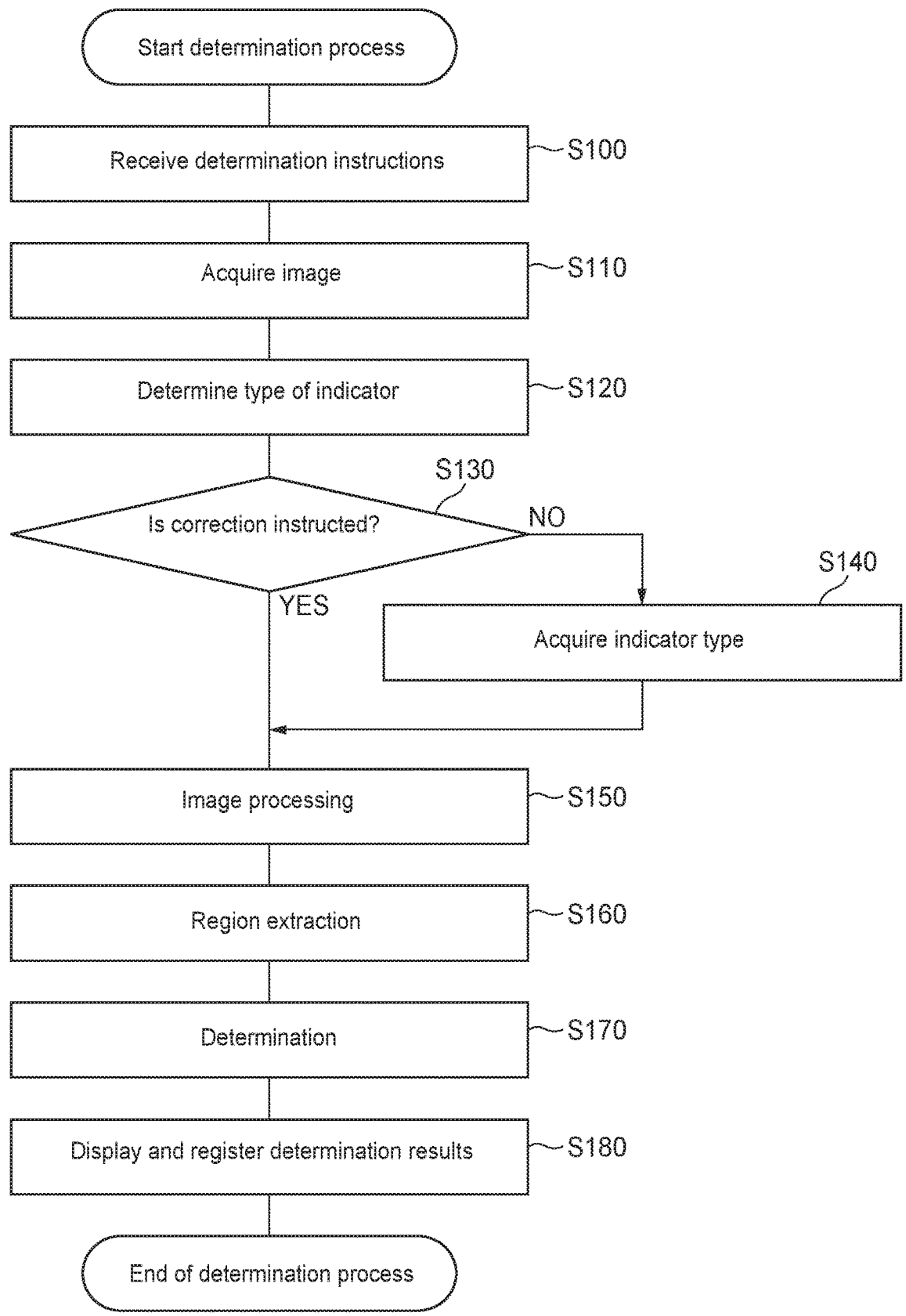
FIG. 11 is a flowchart showing processing details of the status determining process.
Figure 12:
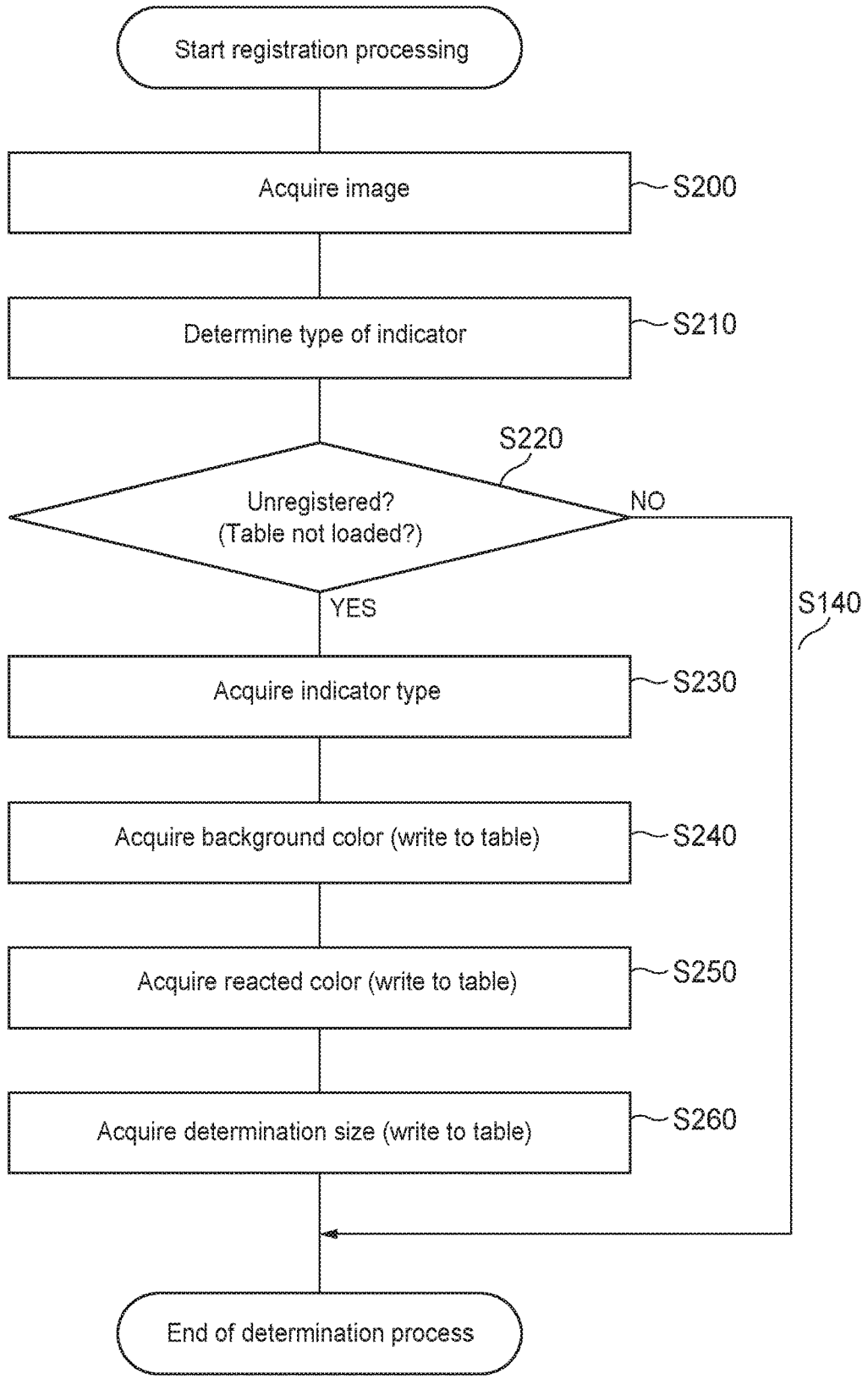
FIG. 12 is a flowchart showing processing details of a registration process.

Next, a method of determining based on the determining system 100 according to the present embodiment will be described while referring to FIG. 10 to FIG. 12.

Figure 10:
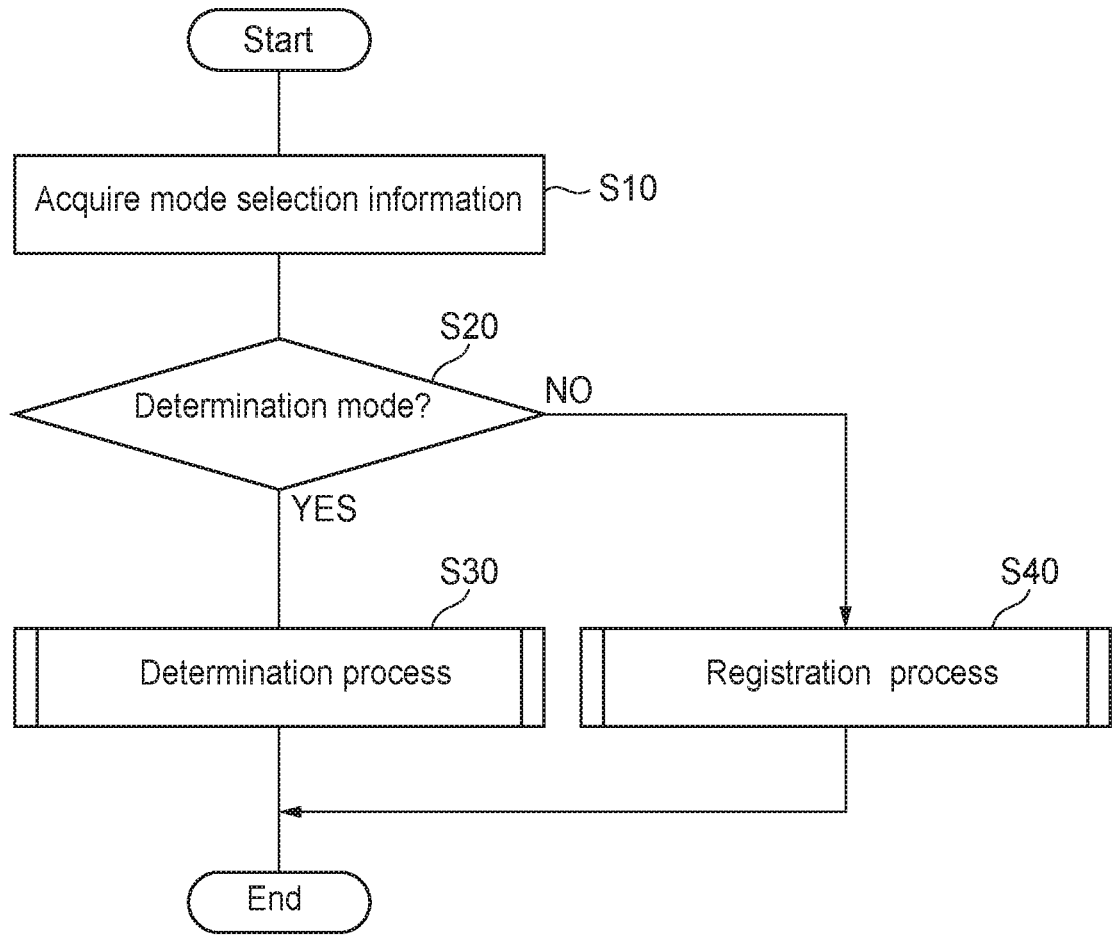
FIG. 10 is a flowchart showing processing details of the determining system.

As shown in FIG. 10, first, the calculating part 150 of the terminal device 110 acquires mode selection information (step S10). In S10, the calculating part 150 acquires information relates to whether or not a determination mode that performs determination of the indicator 1 is selected or whether or not a registration mode that registers information is selected. The calculating part 150 determines whether or not the selected mode is the determination mode (step S20). In step S20, if determined to be in determination mode, the calculating part 150 executes determination processing (step S30), and if determined to be in registration mode, the calculating part 150 executes registration processing (step S40). After executing the processing, the process shown in FIG. 10 ends.

Contents of the determination processing S30 will be described while referring to FIG. 11. First, the calculating part 150 receives a determination instruction from a user (step S100). Next, the image acquiring part 151 acquires an image containing the indicator 1 (step S110: Image acquiring step). The type information acquiring part 152 acquires type information of the indicator 1 and determines the type (step S120: Type information acquiring step). The type information acquiring part 152 acquires type information read from an image. Herein, the type information acquiring part 152 presents the type to a user on the screen, and determines whether or not a correction instruction from the user is present (step S130). In step S130, if correction instruction from the user is present, the type information acquiring part 152 acquires type information based on selection by the user (step S140), and then the process proceeds to step S150. On the other hand, if a correction is not present in the type information in step S130, and an enter button is pressed, the process proceeds to step S150.

The image acquiring part 151 performs image processing such as image color correction or the like, if necessary, based on the type of the indicator 1 (step S150). The color information acquiring part 153 acquires color information before changing and after changing the indicator 1 corresponding to the type. The extracting part 154 the extracts the first region E1 configured from the color after changing the indicator 1 in an image based on the color information (step S160: Color information acquiring step, extracting step). The status determining part 156 compares a shape of the first region E1 extracted in step S160 and a determination status corresponding to the type, and then determines a status of the indicator 1 based on the comparison results (step S170: Status determining step). The status determining part 156 displays and presents the determination results to the user on the screen, associates the image, determination results, and supplementary information, and registers the information in the storing part 122 of the server device 120 (step S180). Thus, the process shown in FIG. 11 ends. Note that the second region E2 configured from a color before changing the indicator 1 may also be extracted in step S160, and step S170 may include adding whether or not the first region E1 and second region E2 overlap to the determination status.

Registration processing S40 will be described while referring to FIG. 12. As shown in FIG. 12, the image acquiring part 151 acquires an image of the indicator 1 captured by a camera (step S200). The type information acquiring part 152 reads a type from the read indicator 1 image and determines the type (step S210). The type information acquiring part 152 refers to a determination status table 123 of the storing part 122 of the server 20 to determine whether or not the identified type is registered in the determination status table 123 (step S220). In the step S220, if determined not to be registered in the determination status table 123, the type information acquiring part 152 acquires type information on the premise that the type is a new indicator 1 (step S230). Note that in step S220, if the type is determined to be already registered, the process shown in FIG. 12 ends.

In step S230, if information for a type of a new indicator 1 is acquired, the calculating part 150 acquires a background color (display color other than the displaying part 2) of the indicator 1 and then writes to the determination status table 123 (step S240). Furthermore, the calculating part 150 acquires a color of the reacted part 4 and then writes to the determination status table 123 (step S250). Furthermore, the calculating part 150 acquires information on determination size that indicates what shape the first region E1 indicating the reacted part 4 has to be for sterilization completion to be determined, and then writes to the determination status table 123 (step S260). When the process of step S260 ends, the process shown in FIG. 12 ends.

Next, a function and effect of the determining system 100, terminal device 110, and method of determining according to the present embodiment will be described.

The determining system 100 according to the present embodiment is a determining system 100 that determines a status of the indicator 1 where optical properties change under a specific environment, and is provided with: the image acquiring part 151 that acquires an image containing the indicator 1; the type information acquiring part 152 that acquires information indicating a type of the indicator 1; the color information acquiring part 153 that acquires color information before change and after change of the indicator 1 corresponding to the type; the extracting part 154 that extracts the first region E1 configured from a color after change of the indicator 1 in the image based on the color information; and the status determining part 156 that determines a status of the indicator 1 based on a shape of the first region E1 extracted by the extracting part 154 and determination status corresponding to the type.

The determining system 100 is provided with the extracting part 154 that extracts the first region E1 configured from a color after change of the indicator 1 in an image, based on color information acquired by a color information acquiring part 153; and the status determining part 156 that determines a status of the indicator 1 based on a shape of the first region E1 extracted by the extracting part 154 and determination status corresponding to a type. The first region E1 configured from a color after change of the indicator 1 is such that shape change proceeds in a manner corresponding to the type based on the degree of progress of a reaction of the indicator 1. Therefore, the determining system 100 can automatically determine the status of the indicator 1 by eliminating the subjectivity of a user based on a shape of the first region E1 and a determination status corresponding to the type. Furthermore, the determining system 100 can determine a status for various types of indicators 1 by preparing a determination status corresponding to a type of the indicator 1. Furthermore, a user can use the determining system 100 to determine a status of the indicator 1 by a simple operation of capturing an image of the indicator 1. As described above, the determining system 100 can automatically determine various types of indicators 1.

In the determining system 100, the first region E1 has a shape extending in the longitudinal direction, and the status determining part 156 determines a status of the indicator 1 based on the aspect ratio of the first region E1. The aspect ratio is constant regardless of whether the indicator 1 projected large or small in an image. Therefore, the status determining part 156 can determine a status regardless of how the indicator 1 is projected in an image.

In the determining system 100, the first region E1 has a long edge E1c and long edge E1d extending in the longitudinal direction, and the status determining part 156 compares lengths of the long edge E1c and long edge E1d to determine a status of the indicator 1. In this case, even if a lower edge E1b of the first region E1 is inclined, the status determining part 156 can determine a status based on the situation.

In the determining system 100, the extracting part 154 extracts a second region E2 configured from a color before change of the indicator 1 in an image, and the status determining part 156 determines a status of the indicator 1 based on whether or not the first region E1 and second region E2 overlap. If overlapping occurs, the status determining part 156 can grasp a condition where the lower edge E1b of the first region E1 is inclined. Thereby, the status determining part 156 can appropriately determine a status based on the status.

In the determining system 100, the extracting part 154 may extract the first region E1 based on acquiring a histogram of a color in an image 10 displayed in a periphery of a location touched by a user, of screens displaying the image. In this case, even if a user does not accurately touch a position of the first region E1, the extracting part 154 can extract the first region E1 if an approximate position is touched.

In the determining system 100, the type information acquiring part 152 automatically determines a type from an image acquired by the image acquiring part 151. In this case, a user can save time for selecting a type of the indicator 1.

The determining system 100 is provided with the information transmitting and receiving part 115 mutually associates image information acquired by the image acquiring part 151, determination results by the status determining part 156, and supplementary information related to the indicator 1 performing determination, and then transmits the information to the storing part 122.

In the determining system 100, if an image is acquired by the image acquiring part 151 in a condition where the indicator 1 is placed on the backboard 7, the image acquiring part 151 performs correction of a color of the indicator 1 in the image based on a color of the backboard 7 in the image. Thereby, the status determining part 156 can determine a status of the indicator 1 based on an image of the corrected status, and therefore can accurately determine a status.

The terminal device 110 according to one aspect of the present embodiment is a determining system 100 that determines a status of the indicator 1 where optical properties change under a specific environment, and is provided with: the image acquiring part 151 that acquires an image containing the indicator 1; the type information acquiring part 152 that acquires information indicating a type of the indicator 1; the color information acquiring part 153 that acquires color information before change and after change of the indicator 1 corresponding to the type; the extracting part 154 that extracts the first region E1 configured from a color after change of the indicator 1 in the image based on the color information; and the status determining part 156 that determines a status of the indicator 1 based on a shape of the first region E1 extracted by the extracting part 154 and determination status corresponding to the type to acquire the status.

According to the terminal device 110, a similar function and effect as the determining system 100 can be achieved.

The determining method according to one aspect of the present embodiment is a determining method that determines a status of the indicator 1 where optical properties change under a specific environment, and is provided with: an image acquiring step that acquires an image containing the indicator 1; a type information acquiring step that acquires information indicating a type of the indicator 1; a color information acquiring step that acquires color information before change and after change of the indicator 1 corresponding to the type; an extracting step that extracts a first region E1 configured from a color after change of the indicator in the image based on the color information; and a status determining step that determines a status of the indicator 1 based on a shape of the first region E1 extracted by the extracting step and determination status corresponding to the type.

According to the determining method, a similar function and effect as the determining system 100 can be achieved.

The present invention is not limited to the aforementioned embodiments.

Figure 13B:
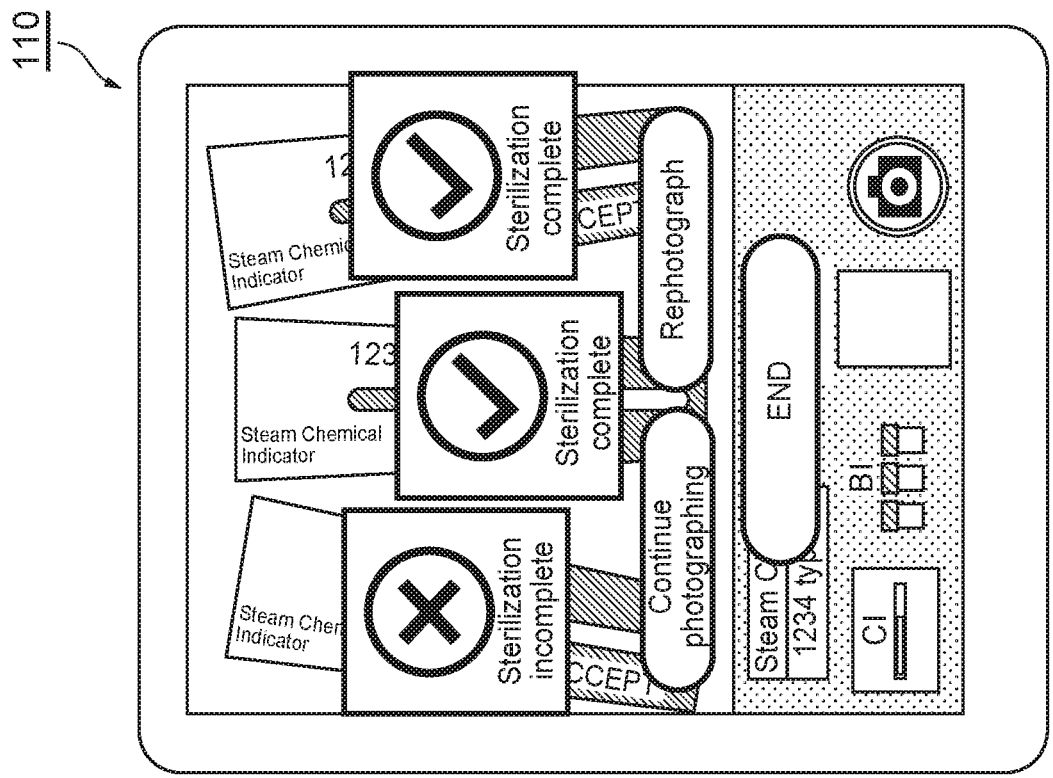
FIG. 13 is a diagram illustrating the screen when determining the status of a plurality of indicators.
Figure 13A:
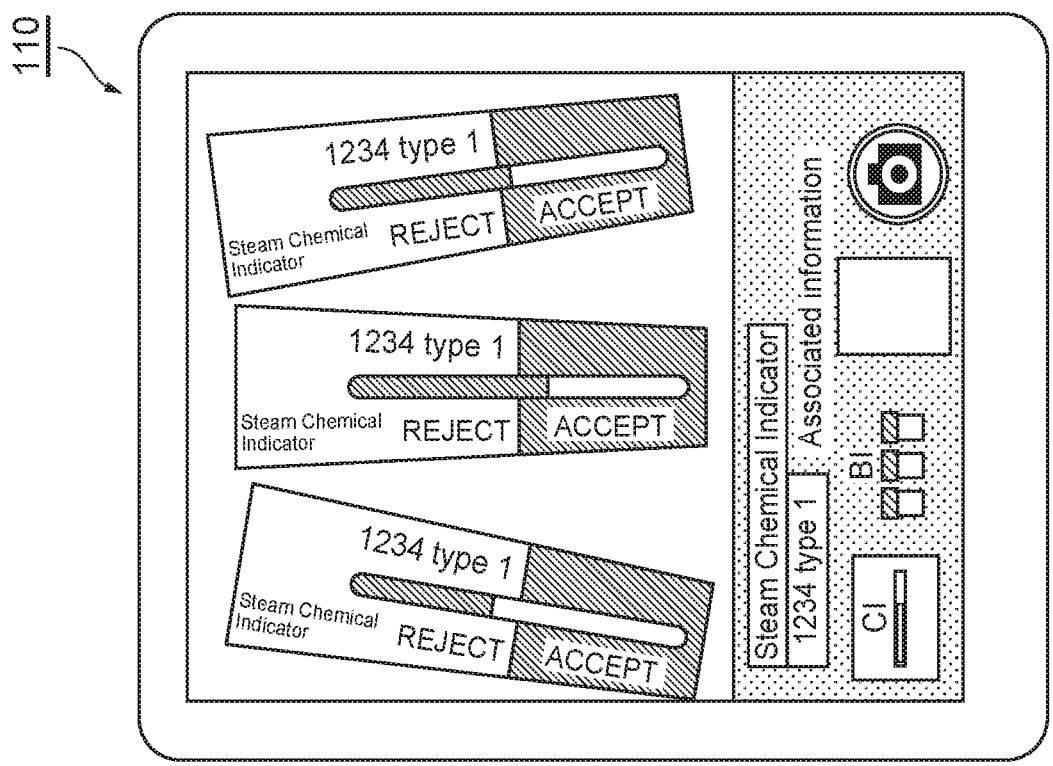

As illustrated in FIG. 13, a plurality of indicators 1 may be simultaneously measured in one operation. For example, the terminal device 110 simultaneously captures a plurality of indicators 1, and acquires an image of the plurality of indicators 1. Furthermore, the terminal device 110 simultaneously performs determination of the plurality of indicators 1. When determination ends, the terminal device 110 displays a determination result with regard to a target indicator 1 at a position so as to overlap the indicator 1 in the image, as illustrated in FIG. 13(b).

Figure 14A:
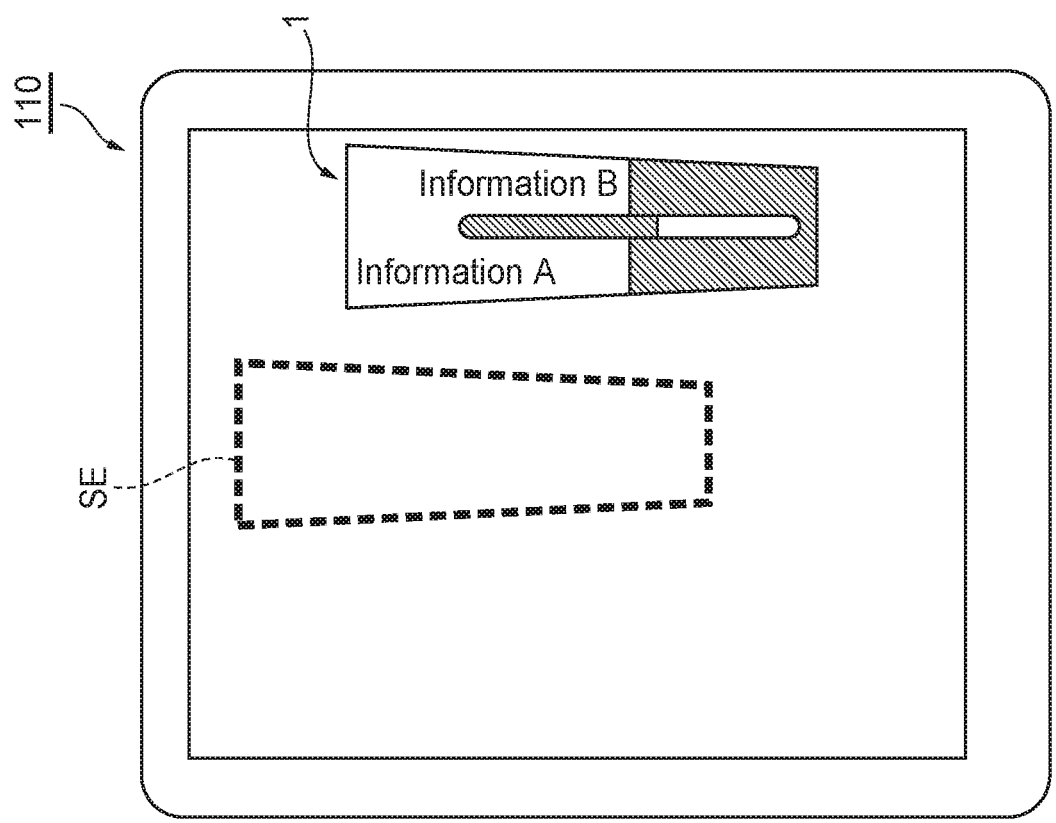
FIG. 14 is a diagram illustrating a condition where an image for aligning is displayed on the screen.
Figure 14B:
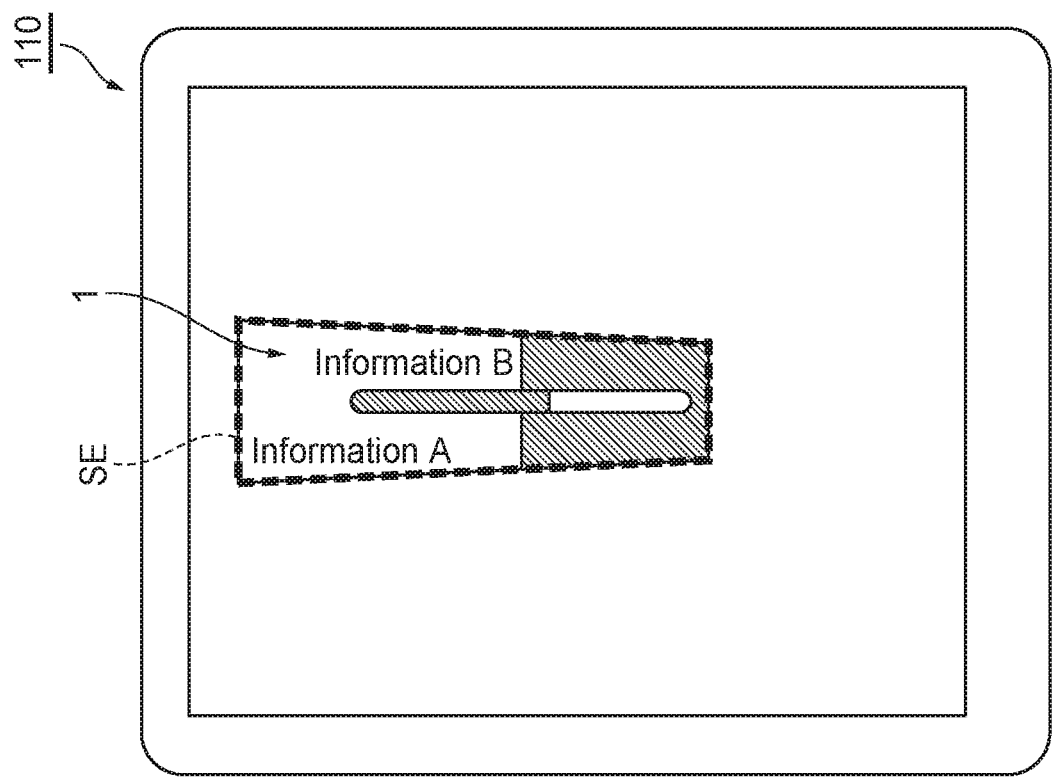

Furthermore, as illustrated in FIG. 14, the type information acquiring part 152 may display on a screen an alignment image SE corresponding to an acquired type. For example, the terminal device 110 displays the alignment image SE so as to performing alignment in the image of the target indicator 1 at a stage before image capturing. A user adjusts a position, angle, or the like of the terminal device 110 such that the indicator 1 in the image matches the alignment image SE. As in FIG. 14(a), when the indicator 1 in the image is disposed at a position deviating from the alignment image SE, a user aligns the terminal device 110 to match the indicator 1 in the image to the alignment image SE as in FIG. 14(b). Thereby, status determination can be performed after adjusting an angle or size of the indicator 1 in the image to some degree for each measurement.

As described above, in the determining system 100, the type information acquiring part 152 displays on a screen the alignment image SE corresponding to an acquired type. Thereby, the status determining part 156 can determine a status of the indicator 1 in an aligned condition in the image, and therefore can accurately determine a status. As described above, an imaging condition (position/size in the image) of the indicator 1 is within a predetermined range, and therefore, a configuration can be such that the first region E1 is extracted without acquiring the touch point T1 by a user operation.

Figure 15A:
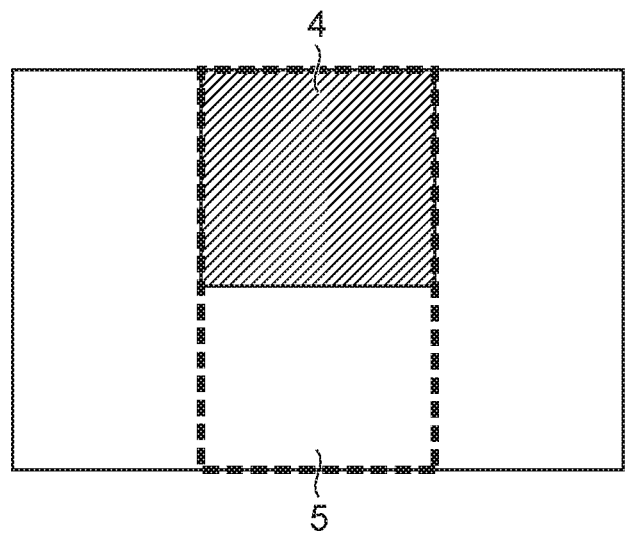
FIG. 15 is a diagram illustrating another indicator.
Figure 15B:
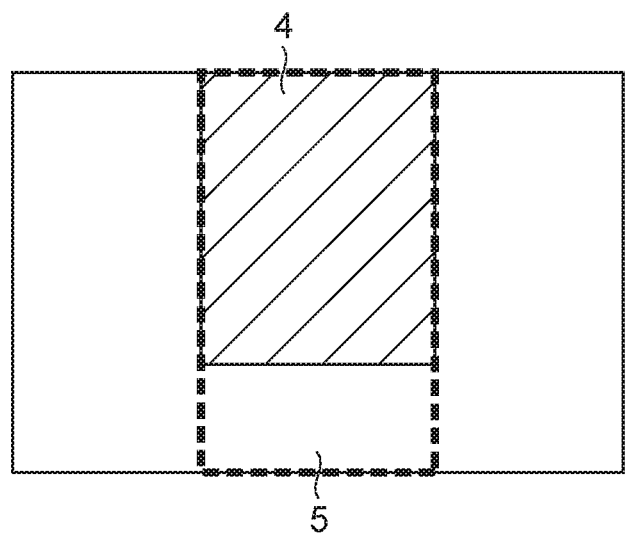

A determination target indicator is not limited to as described above, and any other type of indicator may be used. For example, an indicator illustrated in FIG. 15 is an indicator provided on a mask for hazardous gas. In other words, there are respirators designed to filter or adsorb contaminants present in air in order to protect people from harmful air contaminants. The indicator illustrated in FIG. 15 is used as an indicator for notifying an end of a usable life of a respirator. As an adsorbent for harmful air contaminants (specimens) runs out, an end of a usable life can be identified by a change (often a color change) that occurs when the indicator is exposed to the specimen. With the indicator, not only a length indicating a degree that a gas has penetrated into the indicator, but a concentration of the indicator after the change is also comprehensively determined. The status determining part adjusts a plurality of determination status in consideration of a use environment of the indicator. For example, with the indicator illustrated in FIG. 15(a), a length of the reacted part 4 is short but the color is dark, and with the indicator illustrated in FIG. 15(b), a length of the reacted part 4 is long but the color is light. For example, in a use environment where the length of the reacted part 4 is important, the status determining part determines that mask use is not possible in the case of the indicator in FIG. 15(b), even if the color of the reacted part 4 is light. As described above, determination may be performed in consideration of a plurality of determination status.

Note that the status determining part may refer to the indicator use environment and adjust a determination status for any other type of indicator and not only the indicators illustrated in FIG. 15. As described above, in the determining system 100, the status determining part 156 adjusts a determination status while also referring to the use environment of the indicator 1. Thereby, the status determining part 156 can more accurately determine a status in consideration of the use environment.

Furthermore, in the determining system 100, the color information acquiring part 153 may acquire a reference color in an indicator from an image acquired by the image acquiring part 151, and the extracting part 154 may extract the first region E1 by comparing the reference color and a color after change of the indicator. For example, with a different type of indicator from the embodiment, a reference color is shown in a portion other than the displaying part 2 of the indicator, and sterilization is determined to be completed when a color of the reacted part is the same color as the reference color. In this case, the extracting part 154 can refer to the reference color in the image and extract the first region E1 based on the reference color.

Furthermore, in the aforementioned embodiment, status determination is performed based on the aspect ratio of the first region indicating the reacted part. However, so long as status determination is performed using a shape of the extracted first region, a specific determination status is not particularly limited. Furthermore, the shape of the first region is not particularly limited. For example, the first region may not only be rectangular, but may be a trapezoid, parallelogram, diamond, square, or the like. An affine transformation parameter may be used as a parameter of the determination status. The parameter is an affine transformation parameter when projectively transforming a general square to a rectangle. Furthermore, status determination may be performed using an area and aspect ratio of a rectangle. Furthermore, status determination may be performed using a size and ellipticity of a circle. Status determination may be performed using an area and circumference of a contour line of the first region, number of pixels included in the contour line, and aspect ratio (width/height of circumscribed rectangle). Furthermore, status determination may be performed using an area, width (ratio of contour area and minimum circumscribed rectangle area), Ferret ratio (width of maximum Ferret diameter/contour line), roundness (4 π*contour area/square of contour line circumference), convex hull (contour point surrounding convex hull), convex hull area, solidity (ratio of contour area and convex hull area thereof), diameter of circle having an area equal to the contour area, median value stroke width for stroke width conversion, and distribution of stroke width value generated using stroke width conversion, of a minimum circumscribed rectangle. Note that the aspect ratio (width/height of circumscribed rectangle), Ferret ratio, roundness, and solidity can be measured regardless of a viewing angle of the indicator in the image, and therefore are more preferable as determination status. Note that the configuration may be such that determination is performed by combining the aforementioned parameters.

In the present embodiment, the determination processing may be executed by a desktop personal computer and scanner, digital camera, smartphone, or other image inputting device, in place of executing registration processing of culture medium information using a smartphone, tablet terminal, touch panel type notebook personal computer, or other terminal device 110. In this case, the personal computer and image inputting device may be connected based on a predetermined communication standard, and then the determination processing may be executed integrally using the personal computer and image inputting device. Image data pre-acquired by the image inputting device may be stored in a memory card or other physical memory, and then the determination processing may be executed while capturing the stored image data by the personal computer.

Note that a portion of various calculations by the calculating part 150 may be performed by the server device 120. In other words, the terminal device 110 may transmit information required for calculating to the server device 120. The server device 120 may perform calculations, and then the terminal device 110 may receive the calculation results from the server device 120 For example, the server device 120 may determine the status of the indicator based on a determination status that corresponds to the type and the shape of the first region E1 that was extracted by the extracting part. The calculating part 150 of the terminal device 110 is provided with a status acquiring part that acquires a status of the indicator 1 by acquiring determination results determined by the server device 120. Note that in the aforementioned embodiments, the status determining part 156 functioned as an information acquiring part that determines a status on the indicator 1 by itself, and then acquires a status of the indicator 1 by acquiring the determination results.

DESCRIPTION OF SYMBOLS

1 Indicator
2 Displaying part
3 Base part
4 Reacted part
5 Unreacted part
7 Backboard
10 Screen
100 Determining system
110 Terminal device
111 Display
112 Inputting part
113 Camera
114 Recording part
115 Information transmitting and receiving part (information transmitting part)
120 Server device
150 Calculating part
151 Image acquiring part
152 Type information acquiring part
153 Color information acquiring part
154 Extracting part
156 Status determining part (information acquiring part)

What is claimed is:

1. A determining system for determining a status of an indicator that changes optical properties based on a specific environment, the determining system comprising:
an image acquiring part that acquires an image including an indicator;
a type information acquiring part that acquires information showing type of the indicator;
a color information acquiring part that acquires color information before and after change of the indicator that corresponds to the type;
an extracting part that extracts a first region of the image that contains the color after change of the indicator, based on the color information; and
a status determining part that determines status of the indicator based on a determining status that corresponds to the type and the shape of the first region that was extracted by the extracting part.

2. The determining system according to claim 1, wherein the first region has a shape that extends in a longitudinal direction, and wherein the status determining part determines the status of the indicator based on the aspect ratio of the first region.

3. The determining system according to claim 1, wherein the first region has a first long edge and a second long edge that extend in the longitudinal direction; and
the status determining part determines the status of the indicator by comparing the length of the first long edge and the length of the second long edge.

4. The determining system according to claim 1, wherein the extracting part extracts a second region in the image that contains the color before the change of the indicator; and
the status determining part determines the status of the indicator based on whether or not there is overlap between the first region and the second region.

5. The determining system according to claim 1, wherein the status determining part also references use environment of the indicator, and adjusts the determination status.

6. The determining system according to claim 1, wherein the extracting part extracts the first region based on acquiring a histogram of color in the image displayed in a periphery of a location touched by a user of the screen that displays the image.

7. The determining system according to claim 1, wherein the type information acquiring part automatically determines the type from the image acquired by the image acquiring part.

8. The determining system according to claim 1, further comprising an information transmitting part that mutually associates image information acquired by the image acquiring part, determination results by the status determining part, and supplementary information related to the indicator that performs determination, and then transmits the information to a storing part.

9. The determining system according to claim 1, wherein the type information acquiring part displays on the screen an image for aligning that corresponds to the acquired type.

10. The determining system according to claim 1, wherein the color information acquiring part acquires a reference color in the indicator from inside the image that was acquired by the image acquiring part; and
the extracting part extracts the first region by comparing the color after change of the indicator and the reference color.

11. The determining system according to claim 1, wherein the image acquiring part corrects the color of the indicator in the image based on the color of a backboard in the image when the image is acquired by the image acquiring part in a condition where the indicator is placed on the backboard.

12. A terminal device for determining a status of an indicator that changes optical properties based on a specific environment, the terminal device comprising:
an image acquiring part that acquires an image including an indicator;
a type information acquiring part that acquires information showing type of the indicator;
a color information acquiring part that acquires color information before and after change of the indicator that corresponds to the type;
a status acquiring part that acquires a shape of a first region by the color after change of the indicator in the image based on the color information, and status of the indicator determined based on a determination status corresponding to the type.

13. A determining method for determining a status of an indicator that changes optical properties based on a specific environment, the determining method comprising:
- an image acquiring step that acquires an image including an indicator;
- a type information acquiring step that acquires information showing type of the indicator;
- a color information acquiring step that acquires color information before and after change of the indicator that corresponds to the type; and
- an extracting step that extracts a first region of the image that contains the color after change of the indicator, based on the color information; and
- a status determining step that determines status of the indicator based on a determining status that corresponds to the type and the shape of the first region that was extracted by the extracting part.

\* \* \* \* \*